(12) United States Patent
Sanderson

(10) Patent No.: US 7,732,695 B1
(45) Date of Patent: Jun. 8, 2010

(54) PLAYING CARDS FOR TEACHING MUSIC FUNDAMENTALS

(76) Inventor: Mark A. Sanderson, 2614 N. Tamiami Trail #506, Naples, FL (US) 34103

( * ) Notice: Subject to any disclaimer, the term of this patent is extended or adjusted under 35 U.S.C. 154(b) by 0 days.

(21) Appl. No.: 12/342,909

(22) Filed: Dec. 23, 2008

(51) Int. Cl.
*G09B 15/08* (2006.01)

(52) U.S. Cl. ........................................ 84/481; 84/470 R

(58) Field of Classification Search ............... 84/470 R, 84/471 R, 482
See application file for complete search history.

(56) References Cited

U.S. PATENT DOCUMENTS 2,582,544 A * 1/1952 Johnson ...................... 273/301

6,111,180 A * 8/2000 DiGiulio .................... 84/471 R

* cited by examiner

*Primary Examiner*—Kimberly R Lockett
(74) *Attorney, Agent, or Firm*—Maxey Law Offices, PLLC; Stephen Lewellyn; Brittany Maxey

(57) ABSTRACT

A set of playing cards for teaching music fundamentals through the playing of traditional card games with the set of playing cards is provided. The set of playing cards is divided into a plurality of different card groups, each card group corresponding to a different octave group and including cards depicting the letter names and modifiers of musical pitches in the chromatic scale, each card is associated with only a single musical pitch of the chromatic scale and depicts the one or more letter names and modifiers corresponding to that musical pitch. Each card depicts one or more music scales in the key of the musical pitch associated with the respective card. Each card can depict one or more chords of a music scale in the key of the musical pitch associated with the respective card.

12 Claims, 20 Drawing Sheets

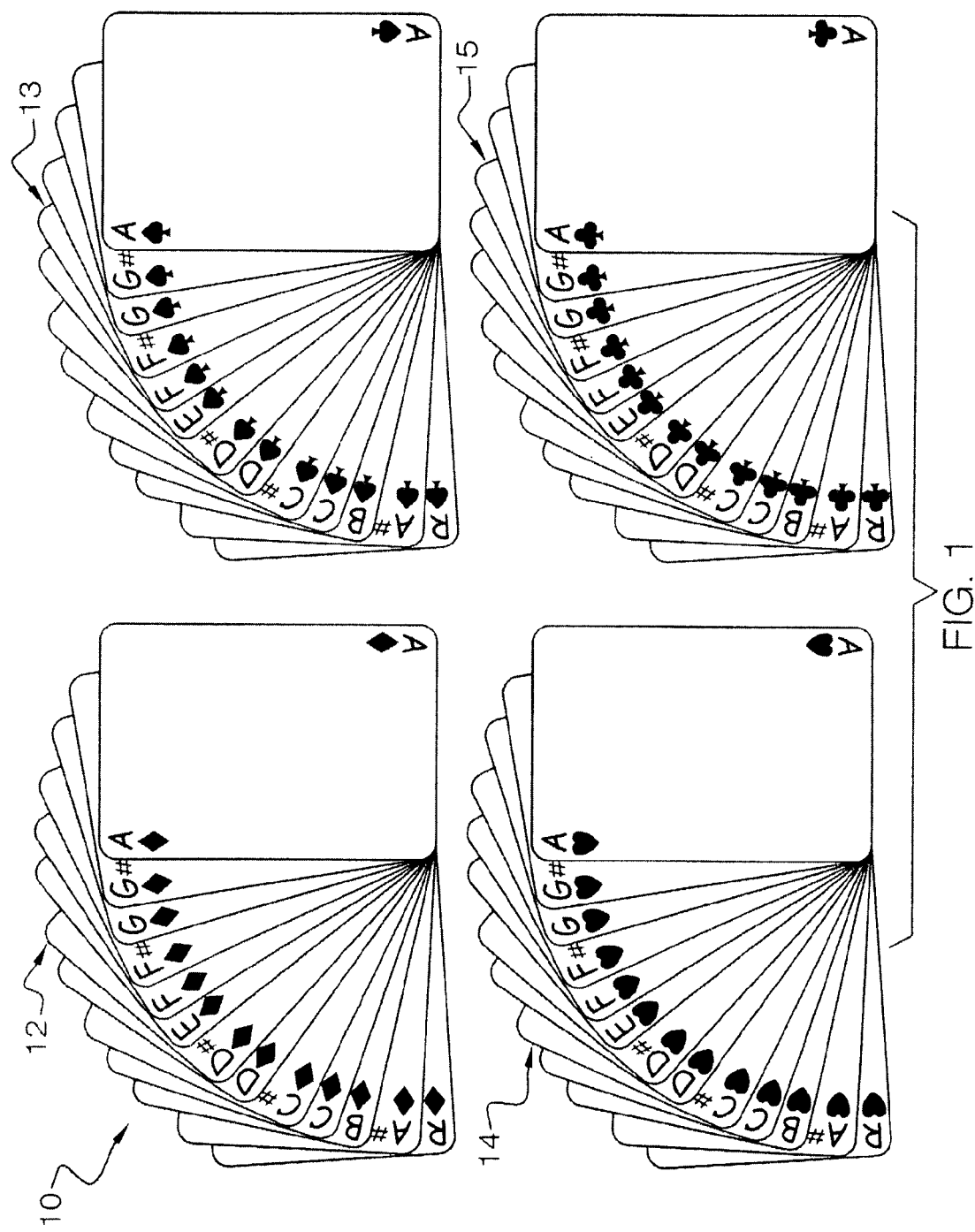

F#
Scales:
♦ Ma → G♭ A♭ B♭ C♭ D♭ E♭ F G♭
Dom7 → G♭ A♭ B♭ C♭ D♭ E♭ F♭ G♭
mi → G♭ A♭ A C♭ D♭ E♭ F♭ G♭
H Dim ∅ → G♭ A♭ A C♭ D E F♭ G♭

740.0 hz

Chords: 1st 3rd 5th 7th 9th
Ma → G♭ B♭ D F A♭
Dom7 → G♭ B♭ D F A♭
mi → G♭ B♭ D F A♭
Half Dim ∅ → G♭ B♭ D F A♭
♦ G♭

FIG. 3i

G
Scales:
♦ Ma → G A B C D E F# G
Dom7 → G A B C D E F G
mi → G A B♭ C D E F G
H Dim ∅ → G A B♭ C D♭ E♭ F G 784.0 hz Chords: 1st 3rd 5th 7th 9th
Ma → G B D F# A
Dom7 → G B D F A
mi → G B♭ D F A
Half Dim ∅ → G B♭ D♭ F A♭
♦ G

FIG. 3j

G#
Scales:
♦ Ma → A♭ B♭ C♭ D♭ E♭ F G♭ A♭
Dom7 → A♭ B♭ C D♭ E♭ F G♭ A♭
mi → A♭ B♭ C♭ D♭ E♭ F G♭ A♭
H Dim ∅ → A♭ B♭ C♭ D♭ E♭ F♭ G♭ A♭

830.7 hz

Chords: 1st 3rd 5th 7th 9th
Ma → A♭ C E♭ G♭ B
Dom7 → A♭ C E♭ G♭ B
mi → A♭ C♭ E♭ G♭ B
Half Dim ∅ → A♭ C♭ E♭ G♭ B
♦ A♭

FIG. 3k

A
Scales:
♦ Ma → A B C#D E F#G#A
Dom7 → A B C#D E F G A
mi → A B C D E F#G A
H Dim ∅ → A B C D E♭F G A 880.0 hz Chords: 1st 3rd 5th 7th 9th
Ma → A C# E G# B
Dom7 → A C# E G B
mi → A C E G B
Half Dim ∅ → A C E♭ G B
♦ A

FIG. 3l

A#
♥ Scales:
Ma ◆ B♭ C D E♭ F G A B♭
Dom7 ◆ B♭ C D E♭ F G A♭ B♭
mi ◆ B♭ C D E♭ F G A♭ B♭
H Dim ∅ ◆ B♭ C D E♭ F G A♭ B♭

58.3 hz

Chords: 1ˢᵗ 3ʳᵈ 5ᵗʰ 7ᵗʰ 9ᵗʰ
Ma ◆ B♭ D F A C
Dom7 ◆ B♭ D F A♭ C
mi ◆ B♭ D♭ F A♭ C
Half Dim ∅ ◆ B♭ D♭ F♭ A♭ C

B
♥ Scales:
Ma ◆ B C# D# E F# G# A# B
Dom7 ◆ B C# D# E F# G# A B
mi ◆ B C# D E F# G# A B
H Dim ∅ ◆ B C# D E F G A B 61.7 hz Chords: 1ˢᵗ 3ʳᵈ 5ᵗʰ 7ᵗʰ 9ᵗʰ
Ma ◆ B D# F# A# C#
Dom7 ◆ B D# F# A C#
mi ◆ B D F# A C#
Half Dim ∅ ◆ B D F A C#

C
♥ Scales:
Ma ◆ C D E F G A B C
Dom7 ◆ C D E F G A B♭ C
mi ◆ C D E♭ F G A B♭ C
H Dim ∅ ◆ C D E♭ F G♭ A♭ B♭ C 65.4 hz Chords: 1ˢᵗ 3ʳᵈ 5ᵗʰ 7ᵗʰ 9ᵗʰ
Ma ◆ C E G B D
Dom7 ◆ C E G B♭ D
mi ◆ C E♭ G B♭ D
Half Dim ∅ ◆ C E♭ G♭ B♭ D

C#
♥ Scales:
Ma ◆ C D E F G A B C
Dom7 ◆ C D E F G A B♭ C
mi ◆ C D E♭ F G A B♭ C
H Dim ∅ ◆ C D E♭ F G♭ A♭ B♭ C 69.3 hz Chords: 1ˢᵗ 3ʳᵈ 5ᵗʰ 7ᵗʰ 9ᵗʰ
Ma ◆ D♭ F A♭ C E♭
Dom7 ◆ D♭ F A♭ C♭ E♭
mi ◆ D♭ F♭ A♭ C♭ E♭
Half Dim ∅ ◆ D♭ F♭ A C♭ E♭

F#♥
Scales:
Ma → G♭ A♭ B♭ C♭ D♭ E♭ F G♭
Dom7 → G♭ A♭ B♭ C♭ D♭ E♭ F♭ G♭
mi → G♭ A♭ A C♭ D♭ E♭ F♭ G♭
H Dim ∅ → G♭ A♭ A C♭ D E F♭ G♭

92.5 hz

Chords: 1ˢᵗ 3ʳᵈ 5ᵗʰ 7ᵗʰ 9ᵗʰ
Ma → G♭ B♭ D♭ F A♭
Dom7 → G♭ B♭ D♭ F♭ A♭
mi → G♭ B♭ D♭ F A♭
Half Dim ∅ → G♭ B♭ D♭ F A♭

G♥
Scales:
Ma → G A B C D E F#G
Dom7 → G A B C D E F G
mi → G A B♭ C D E F G
H Dim ∅ → G A B♭ C D♭ E♭ F G 98.0 hz Chords: 1ˢᵗ 3ʳᵈ 5ᵗʰ 7ᵗʰ 9ᵗʰ
Ma → G B D F# A
Dom7 → G B D F A
mi → G B♭ D F A
Half Dim ∅ → G B♭ D F A

G#♥
Scales:
Ma → A♭ B♭ C D♭ E♭ F G#A♭
Dom7 → A♭ B♭ C D♭ E♭ F G♭ A♭
mi → A♭ B♭ C♭ D♭ E♭ F G♭ A♭
H Dim ∅ → A♭ B♭ C♭ D♭ E♭ F♭ G♭ A♭

103.8 hz

Chords: 1ˢᵗ 3ʳᵈ 5ᵗʰ 7ᵗʰ 9ᵗʰ
Ma → A♭ C E♭ G B
Dom7 → A♭ C E♭ G♭ B
mi → A♭ C♭ E♭ G♭ B
Half Dim ∅ → A♭ C♭ E♭ G♭ B

A♥
Scales:
Ma → A B C#D E F#G#A
Dom7 → A B C#D E F#G A
mi → A B C D E F G A
H Dim ∅ → A B C D E♭ F G A 110.0 hz Chords: 1ˢᵗ 3ʳᵈ 5ᵗʰ 7ᵗʰ 9ᵗʰ
Ma → A C#E G#B
Dom7 → A C#E G B
mi → A C E G B
Half Dim ∅ → A C E G B

A♠

PLAYING CARDS FOR TEACHING MUSIC FUNDAMENTALS

The present invention relates generally to the teaching of music fundamentals, and more particularly, relating to playing cards for teaching the vocabulary and building blocks of music, including music notes, music scales, music structure and music chords, among other music fundamentals.

BACKGROUND OF THE INVENTION

In music, a note is a unit of fixed pitch that has been given a name, or the graphic representation of that pitch in a notation system, and often specifies a duration of time. In music, a scale is an ascending or descending series of notes or pitches. Scales are described in many types such as tonal, modal, diatonic, derived or synthetic, and by the number of tones included. In Western European music, the superset of all tones is the chromatic scale consists of an ascending or descending sequence of all defined pitches. In the chromatic scale there are twelve pitches, and in the English language, these pitches are traditionally assigned the following primary letter names: A, B, C, D, E, F and G. Modifiers are given to the letter names to complete the remaining five pitches. The two main modifiers are sharps and flats, and which respectively raise or lower the pitch of a note by a semitone. These are used to create the additional five notes necessary to complete the chromatic scale. The sharp symbol is ♯ (similar to the pound symbol, #), the flat symbol is ♭ (similar to a lower-case b). Each letter name is assigned to a specific pitch regardless of the octave in which the pitch resides. Each pitch within an octave is identified with one letter identifier with a sharp or flat modifier as needed.

The ascending chromatic scale includes twelve pitches having the following letter names and modifiers starting at A: A, A♯, B, C, C♯, D, D♯, E, F, F♯, G, and G♯. The same twelve tones arranged in a descending chromatic scale have the following letter names and modifiers starting at A: A, A♭, G, G♭, F, E, E♭, D, D♭, C, B, and B♭. The following letter names are equivalents, and refer to the same pitch: B♭ and A♯, D♭ and C♯, E♭ and D♯, G♭ and F♯, and A♭ and G♯.

In music, a chord is a set of three or more different pitches that sound simultaneously. One way of classifying chords is according to the number of distinct pitch classes used in their construction, a pitch class being identified by a degree of the scale (that is, a certain musical note, such as A, B, C, D, etc.) without regard to which octave it occurs in. Chords using three pitch classes are called triads. Chords using four notes are known as tetrads. Those using five are called pentads, and those using six are hexads. They are sometimes called trichords, tetrachords, pentachords and hexachords. Many chords can be arranged as a series whose elements are separated by intervals that are all the same interval distance from each other. For example, a C major triad contains the notes C, E, and G, which has the distance of five semi-tones from C to E and then four semi-tones from E to G. The distance of five semi-tones is also known as a Major interval. The distance of four semi-tones is also known as a minor interval. All major cords are built with a minor interval placed on top of a Major interval.

As mentioned above, each pitch can be represented in a graphical notation system called a score or sheet music. Each pitch in this notation system is represented by a note symbol positioned on a staff according to the particular pitch. The note symbol is generic in representation and by itself it does not correspond to any one particular pitch. The note symbol location on the staff determines the pitch that it corresponds with. The note symbol also indicates the time duration a pitch is played, which is referred to as a note value. Note values are, typically, categorized as whole notes, half notes, quarter notes, eighth notes, etc.

Learning the vocabulary and building blocks of music, such as music scales, intervals, music chords, octaves, and musical pitches, among others can be a tedious and daunting task for a novice. Various games based on playing cards have been developed for the teaching the reading of the graphical notation of notes written in a score. These prior playing cards familiarize a student with how musical notes are positioned on a musical staff and acquaint the student with a note value or the length of time a note should be played.

SUMMARY OF THE INVENTION

In general, in one aspect, a set of playing cards for teaching music fundamentals is provided. The playing cards are divided into a plurality of different card groups, wherein each card group corresponds to a different octave group and includes cards depicting the letter names and modifiers of musical pitches in the chromatic scale. Each individual card is associated with only a single musical pitch of the chromatic scale and depicts the one or more letter names and modifiers corresponding to that musical pitch.

In general, in another aspect, each card can depict one or more music scales in the key of the musical pitch associated with the respective card. The one or more music scales can include at least the major scale, the dominate seven scale, the minor scale, and the half diminished scale.

In general, in another aspect, each card can depict one or more chords of a music scale in the key of the musical pitch associated with the respective card. Each of the one or more chords can include at least the first, the third, the fifth, the seventh and the ninth interval of the respective chord.

In general, in another aspect, each card of a card group can depict a card group identifier that is unique to that card group.

In general, in another aspect, each card can depict the audio frequency value of the musical pitch associated with the respective card and according to the card group of which the respective card belongs.

In general, in another aspect, each card can depict the letter name and modifier of an equivalent musical pitch of the musical pitch associated with the respective card when an equivalent musical pitch exists.

In general, in another aspect, each card group can further include a reference card. The reference card can depict a plurality of music structures ordered in a ranking from highest to lowest according to the mathematical probability of forming each music structure during game play using the set of playing cards.

In general, in another aspect, the set of playing cards can include a pair of wild cards. At least one card of the pair of wild cards can depict a map correlating each musical pitch of the chromatic scale to a set of traditional playing cards.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which:

FIG. 1 is a diagrammatic view of a set of playing cards divided into separate card groups;

FIGS. 3a-3m are diagrammatic views of the playing cards of a second card group;

FIGS. 5a-5m are diagrammatic views of the playing cards of a fourth card group;

DETAILED DESCRIPTION OF THE INVENTION

Figure 2A:
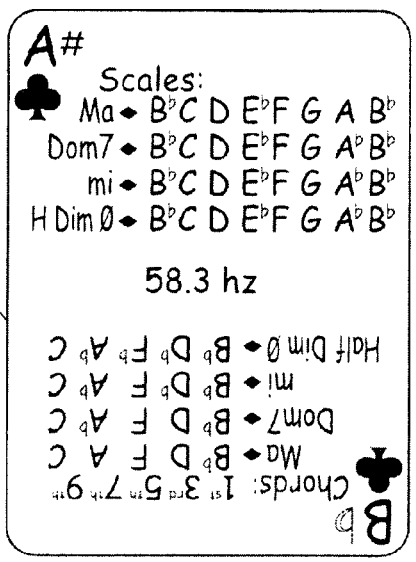
FIGS. 2a-2m are diagrammatic views of the playing cards of a first card group.
Figure 2B:
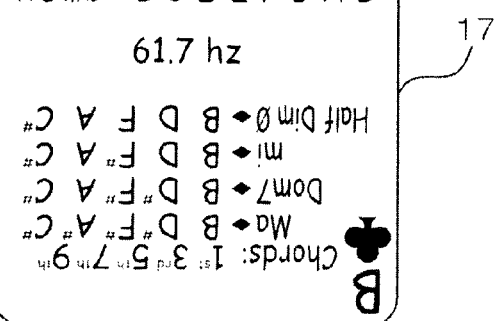
Figure 2C:
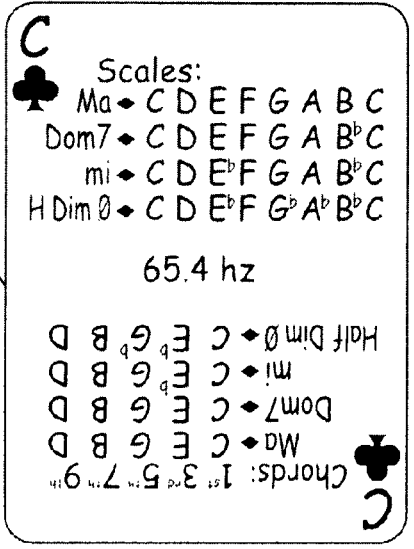
Figure 2D:
Figure 2E:
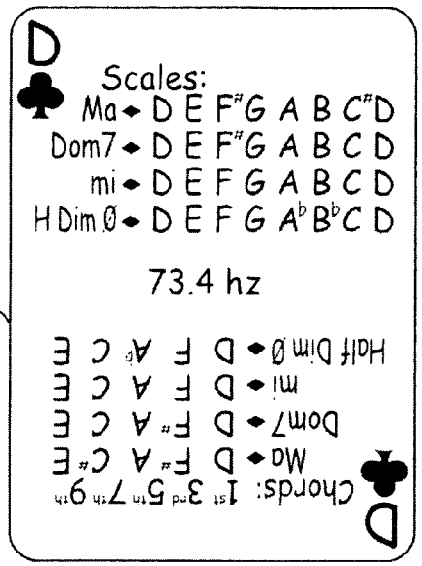
Figure 2F:
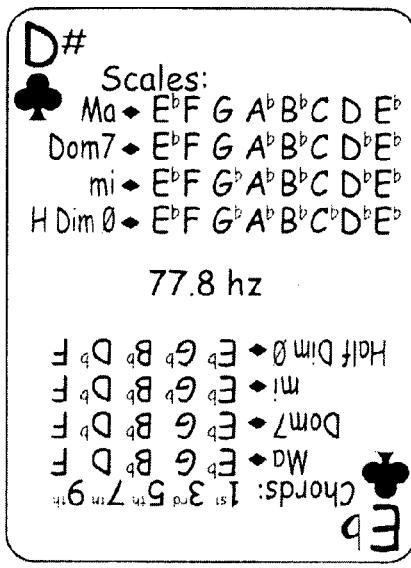
Figure 2G:
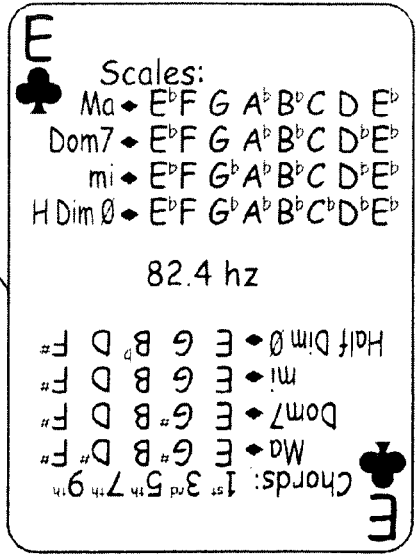
Figure 2H:
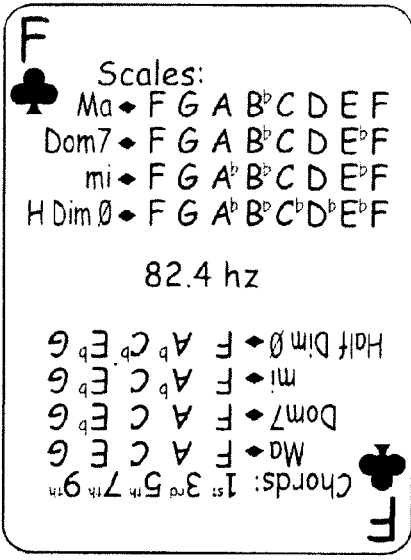
Figure 2I:
Figure 2J:
Figure 2K:
Figure 2L:
Figure 2M:
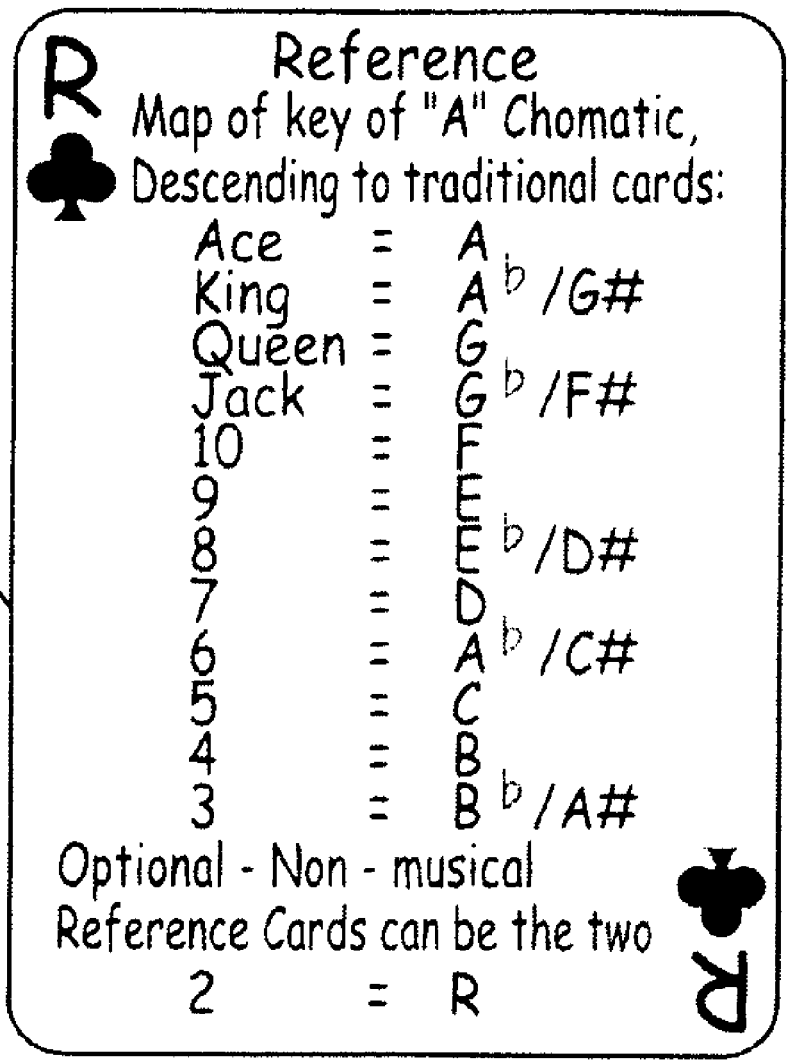
Figure 3A:
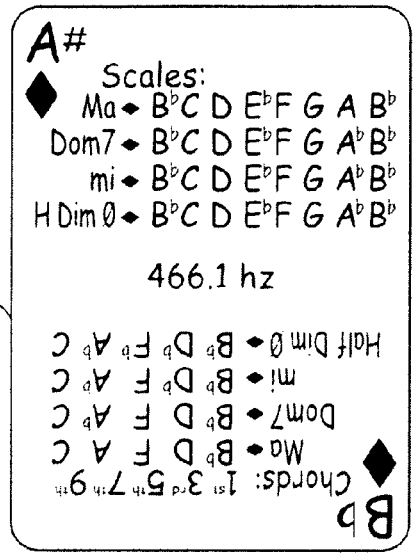
Figure 3B:
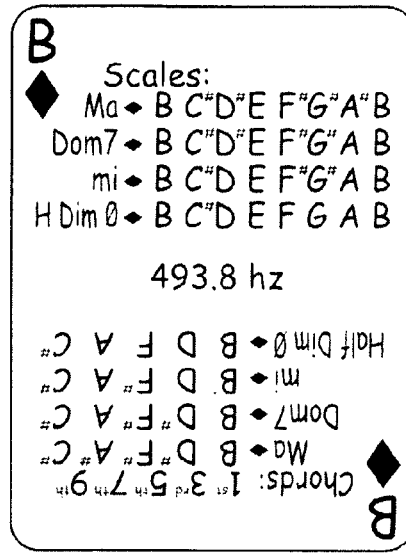
Figure 3C:
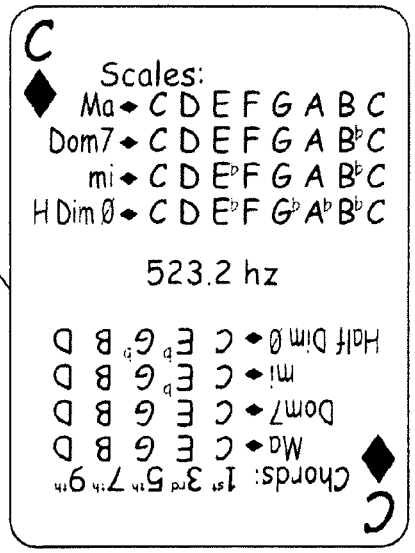
Figure 3D:
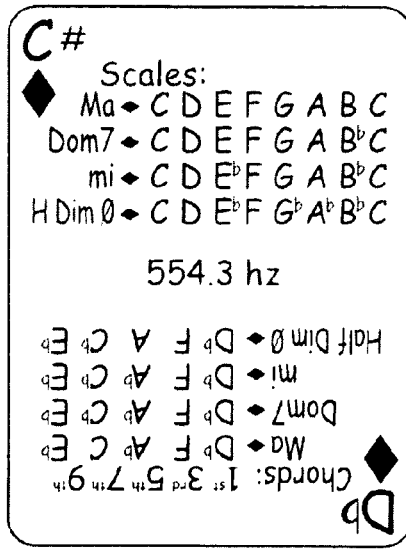
Figure 3E:
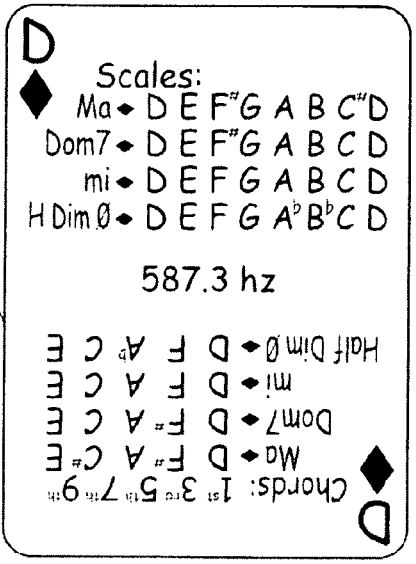
Figure 3F:
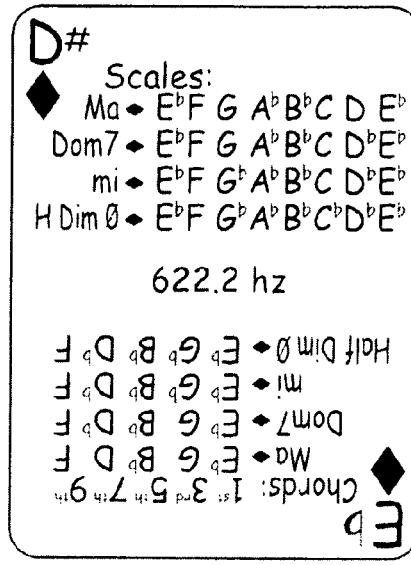
Figure 3G:
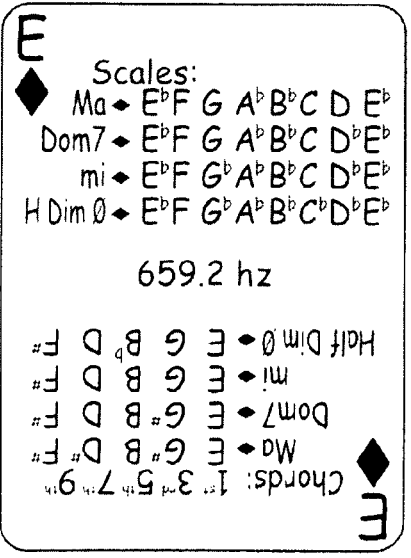
Figure 3H:
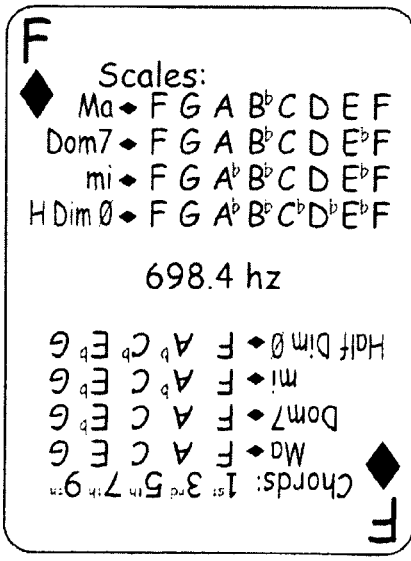
Figure 3M:
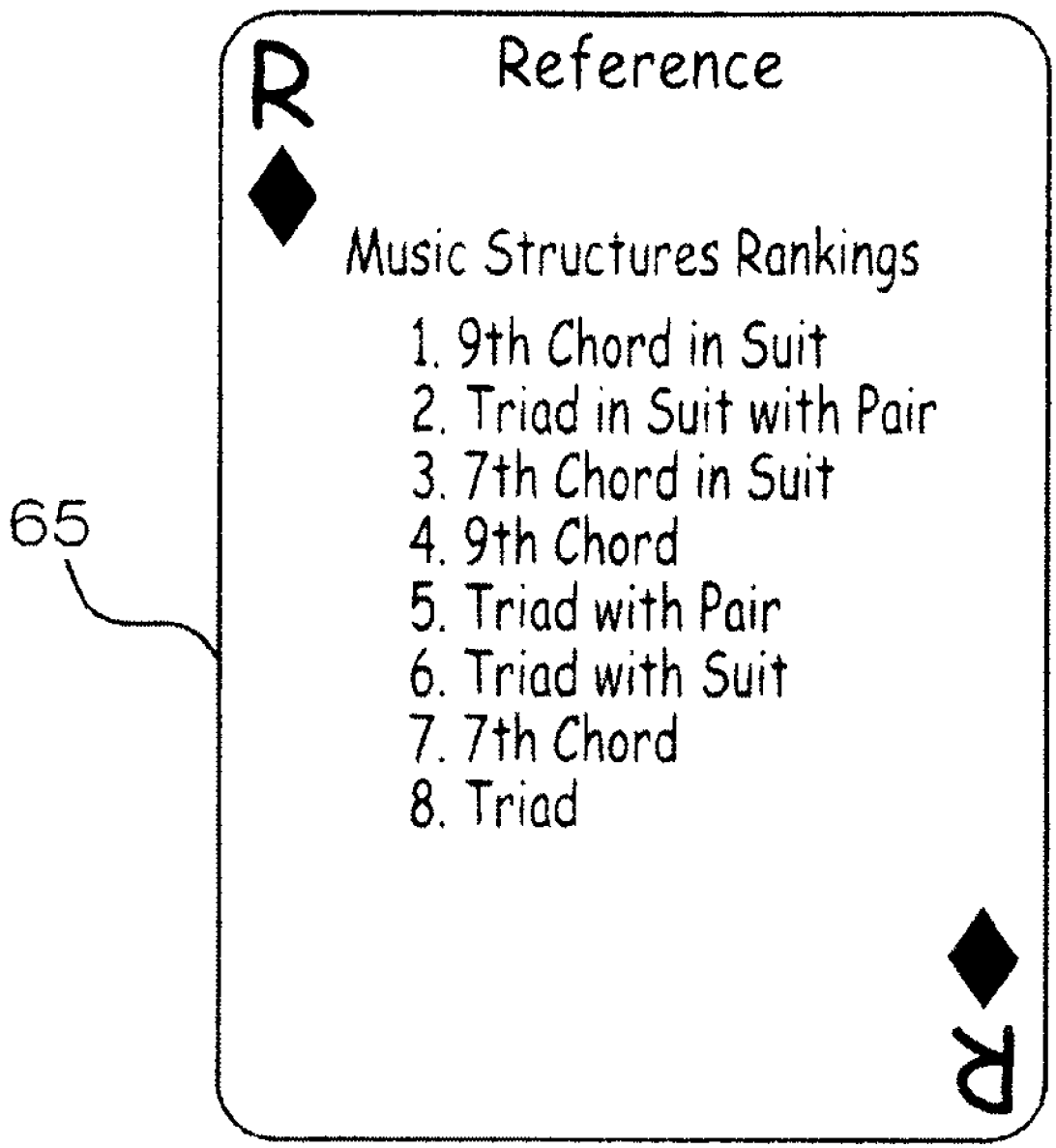
Figure 4A:
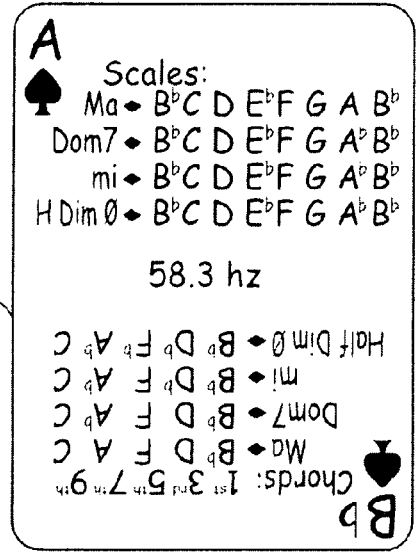
FIGS. 4a-4m are diagrammatic views of the playing cards of a third card group.
Figure 4B:
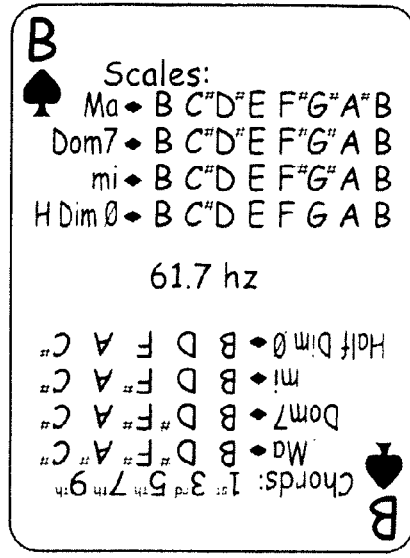
Figure 4C:
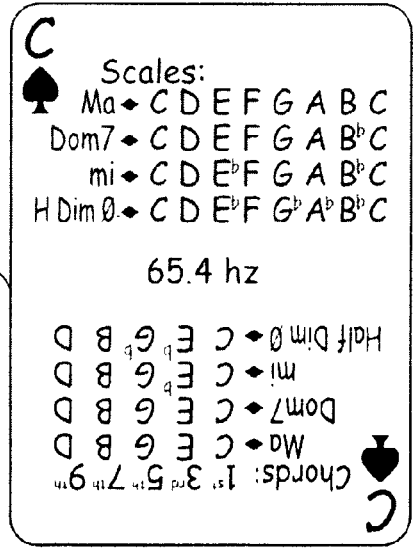
Figure 4D:
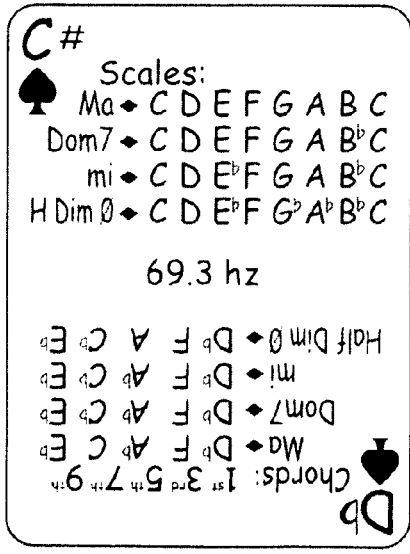
Figure 4E:
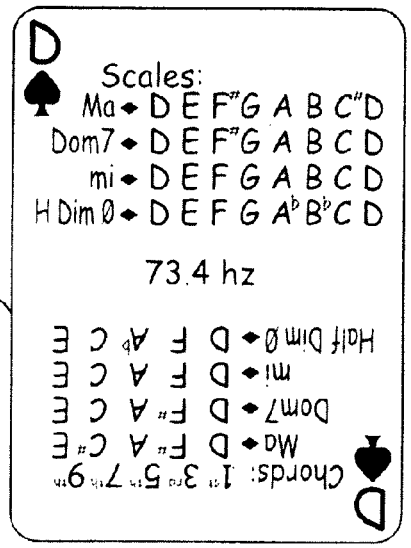
Figure 4F:
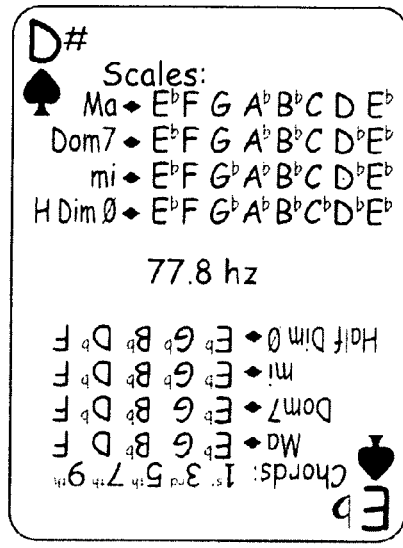
Figure 4G:
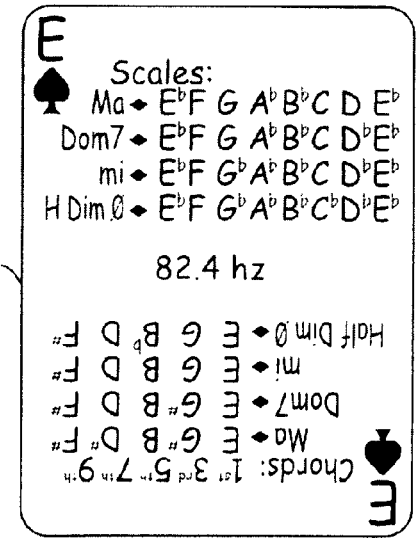
Figure 4H:
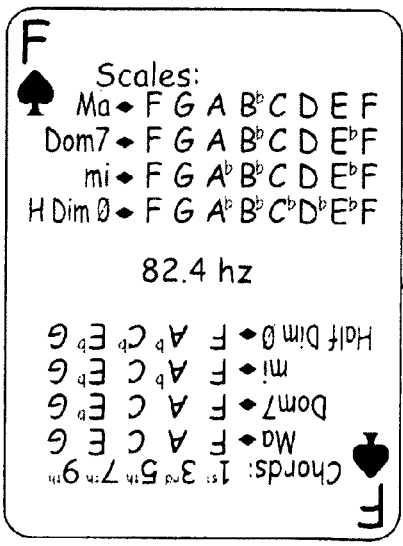
Figure 4I:
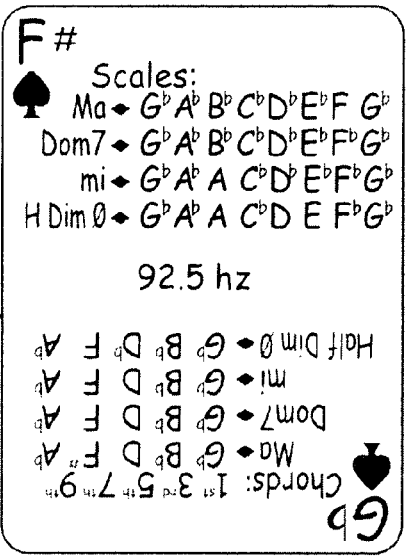
Figure 4J:
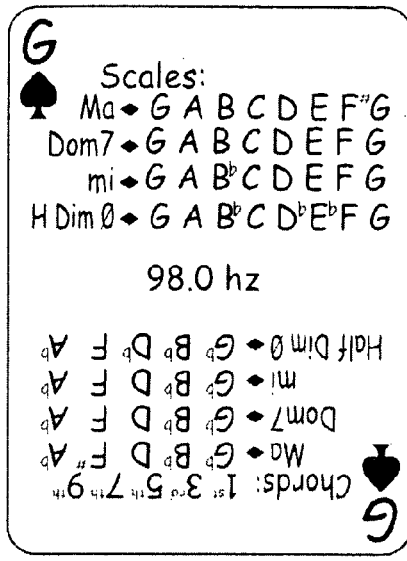
Figure 4K:
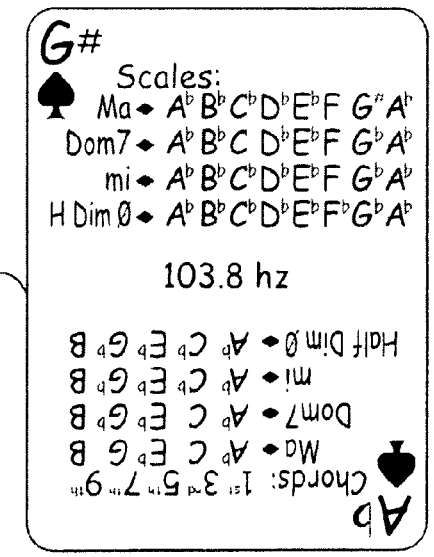
Figure 4L:
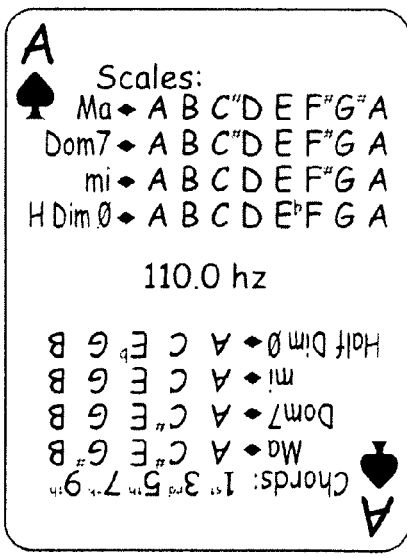
Figure 4M:
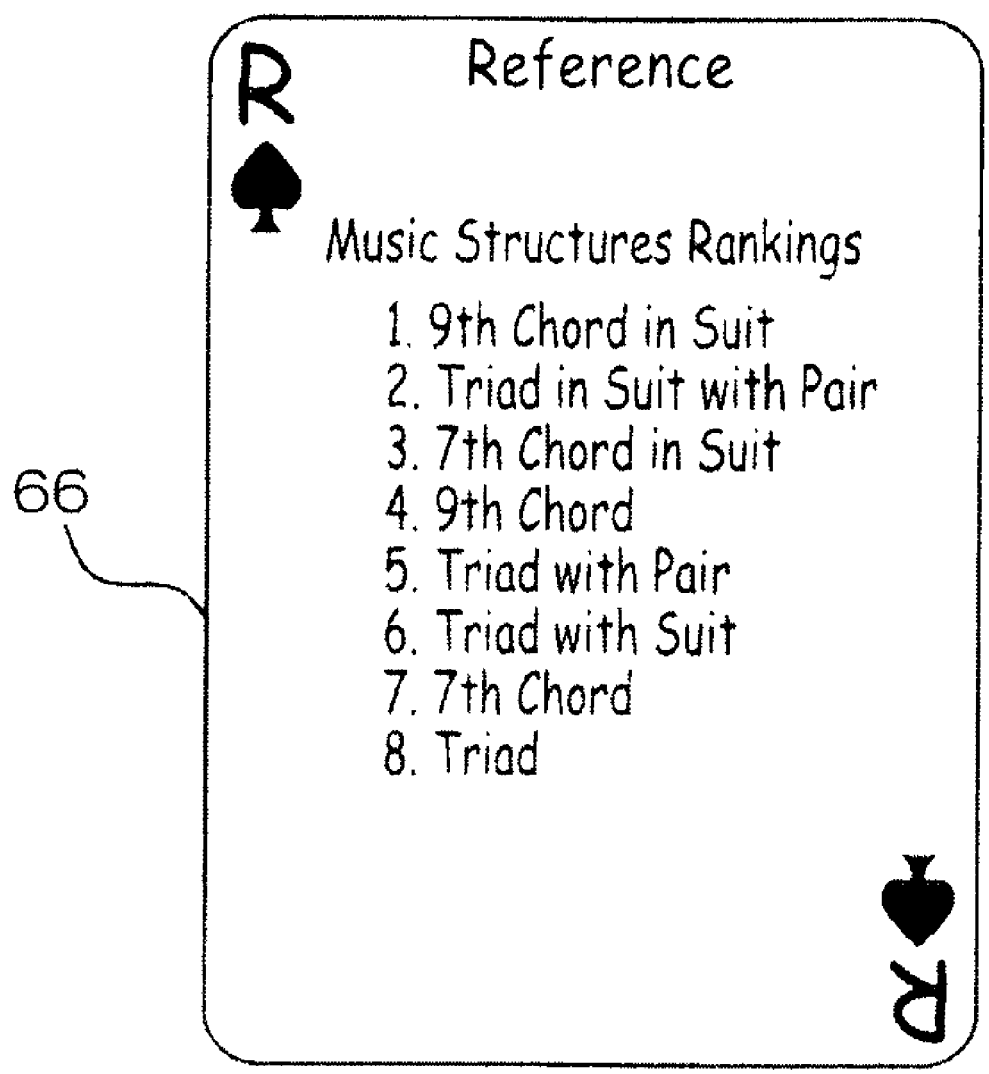
Figure 5E:
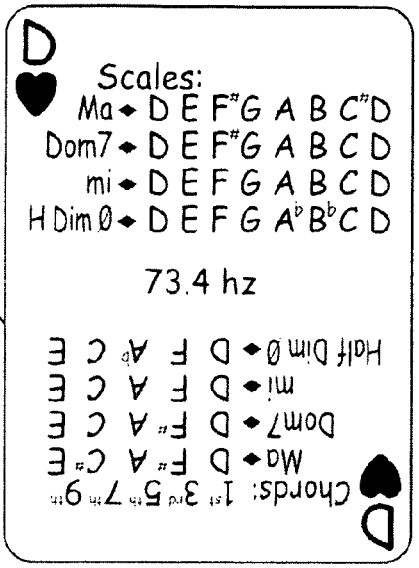
Figure 5F:
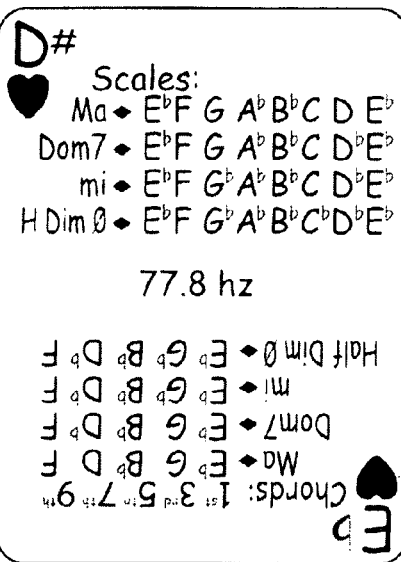
Figure 5G:
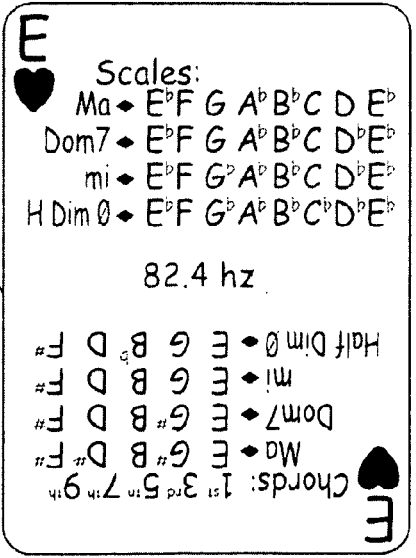
Figure 5H:
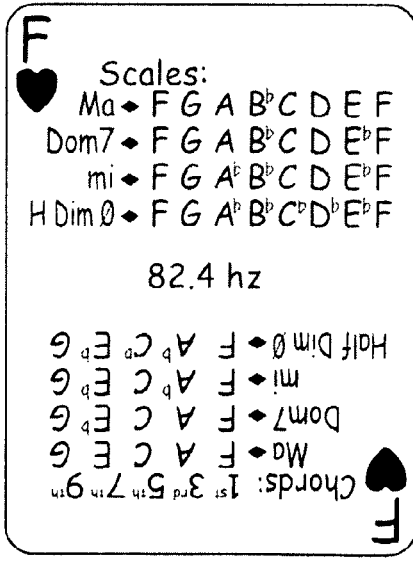
Figure 5M:
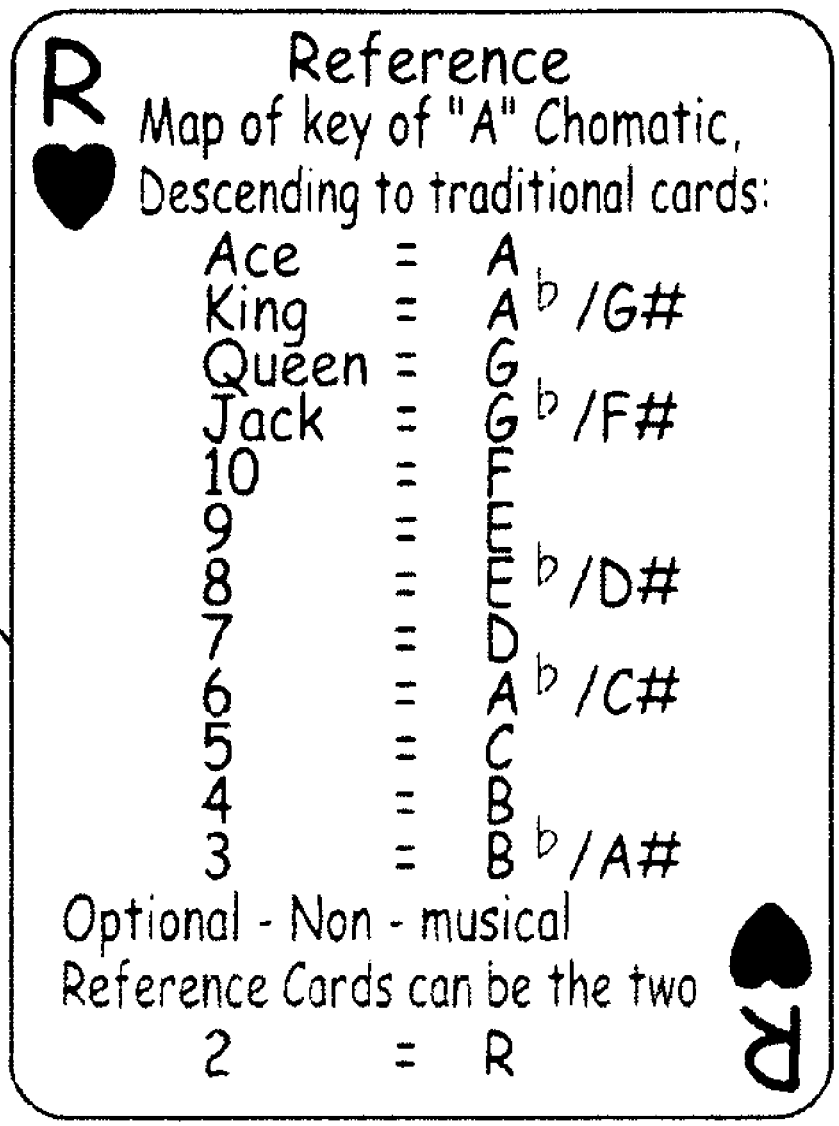

In FIG. 1, there is shown a set of playing cards 10 for teaching music fundamentals by playing conventional card games with the set of playing cards, in accordance with the principles of the present invention. The set of playing cards 10 is divided into a plurality of different card groups or suits, such as card groups 12-15. Each card group 12-15 corresponds to a different octave group. For example, card group 12 corresponds to a first octave group, card group 13 corresponds to a second octave group that is one octave higher than the first octave group, card group 14 corresponds to a third octave group that is three octaves higher than the first octave group, and card group 15 corresponds to a fourth octave group that is four octaves higher than the first octave group.

With reference to FIGS. 2a-2m, 3a-3m, 4a-4m and 5a-5m, there is illustrated the individual cards of card groups 12-15, respectively. The cards of each card group 12-15 are each associated with a single pitch in the chromatic scale, and depict the letter name and modifier (if one exists) for the single pitch. Thus, each card group 12-15 includes at least twelve cards, each card corresponding to one of the following pitches of the chromatic scale: A, A♯, B, C, C♯, D, D♯, E, F, F♯, G, and G♯. Where there is more than one letter name and modifier for the same musical pitch, the corresponding letter name and modifier may also be depicted. For example, the card corresponding to the pitch A♯ can also depict B♭, as both letter names correspond to the same musical pitch. Illustratively, card group 12 includes cards 16-27, card group 13 includes cards 28-39, card group 14 includes cards 40-51, and card group 15 includes cards 52-63, for a total of forty-eight cards.

Figure 6:
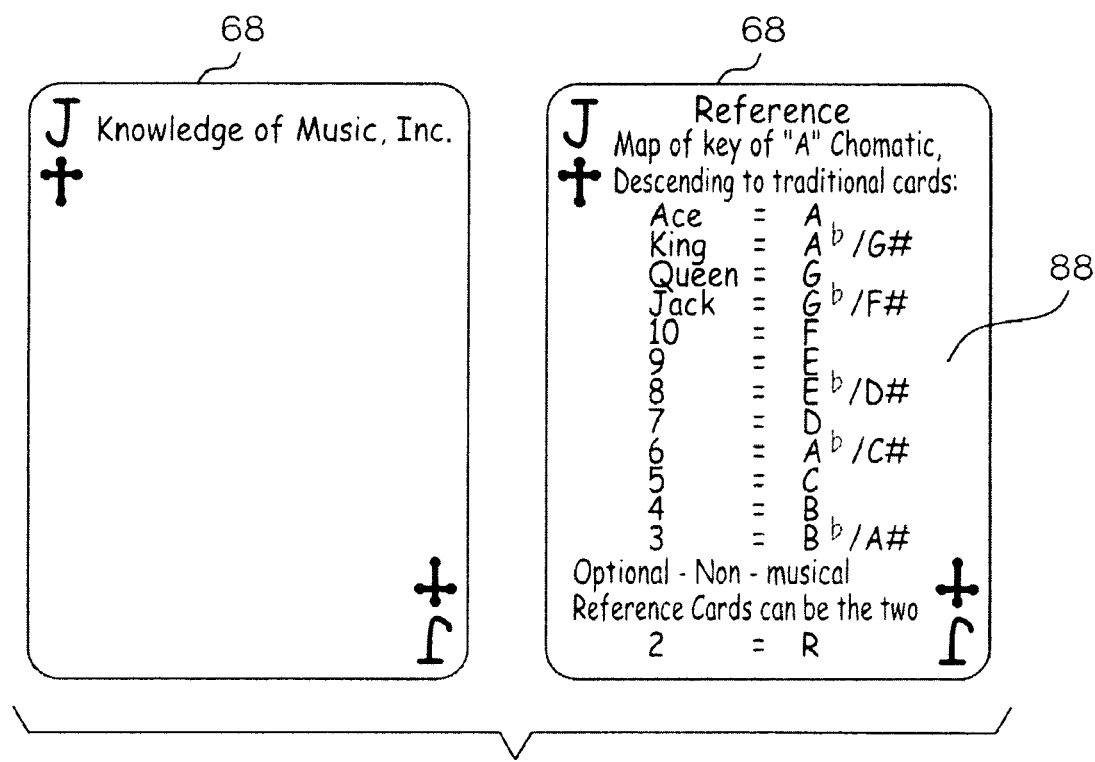
FIG. 6 is a diagrammatic view of optional wild cards of the set of playing cards.

To correspond to a standard deck of cards, which has fifty-two cards, each card group 12-15 may be provided with a single additional card 64-67, respectively, that does not correspond to a musical pitch. These additional cards 64-67 may be termed reference cards. Additionally, a pair of wild cards 68 and 69, illustrated in FIG. 6 may be included with the set of cards 10.

With reference back to FIGS. 2a-2m, 3a-3m, 4a-4m and 5a-5m, each card of card groups 12-15 may depict one or more music scales in key of the musical pitch associated with the respective card. For example, the card associated with musical pitch C, may depict the major scale in the key of C, which has the following series of musical pitches: C, D, E, F, G, A, B and C. Likewise, the card associated with musical pitch D, may depict the major scale in the key of D, which has the following series of musical pitches: D, E, F♯, G, A, B, C♯ and D. The same concept applies to the remainder of the cards in each card group. In one aspect, the major scale, the dominate seven scale, the minor scale, and the half diminished scale may each be depicted on each card in the key of the musical pitch associated with the card. The scales may be depicted in any combination thereof. Other scales could also be depicted.

Each card of card groups 12-15 may depict one or more chords of a music scale in the key of the musical pitch associated with the respective card. The one or more depicted chords can include the first, the third, the fifth, and the ninth interval of the respective chord. More or less intervals may be depicted. For example, the card associated with musical pitch C, may depict the chord of the major scale in key C from the first to the ninth interval, respectively, as C, E, G, B and D. Likewise, the card associated with the musical pitch D, may depict the chord of the major scale in key D from the first to the ninth interval, respectively, as D, F♯, A, C♯, and E. The same concept applies to the remainder of the cards in each card group. In one aspect, the first to the ninth interval of the chords of the major scale, the dominate seven scale, the minor scale, and the half diminished scale may be each depicted on each card in the key of the musical pitch associated with the card. The chords may be depicted in any combination thereof. Chords of other scales could also be depicted.

Each card of card groups 12-15 may depict the audio frequency of the musical pitch associated with the respective card and according to the card group of which the respective card belongs. For example, the card associated with musical pitch C in card group 12 may depict a frequency value of 65.4 Hz, which is the frequency of the musical pitch C in the octave group associated with card group 12. To further illustrate this, the card associated with musical pitch C in card group 13 would depict a frequency value of 130.8 Hz, which is one octave higher than the frequency of the musical pitch C in card group 12. The remaining cards can depict the frequency of the musical pitch following this illustrative example.

Figure 7A:
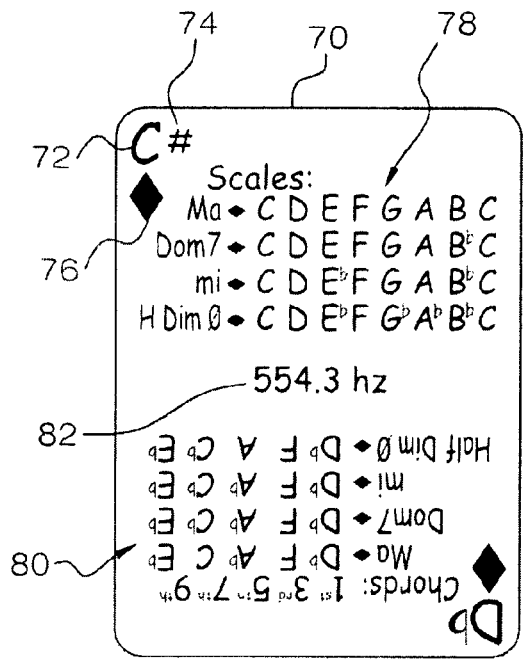
FIGS. 7a and 7b is a diagrammatic view of a single card shown as an illustrative example of a preferred layout of each card associated with a musical pitch.
Figure 7B:
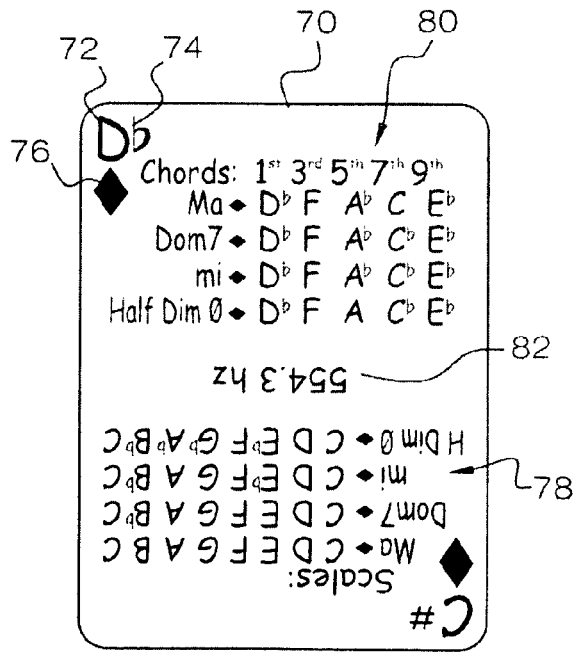

With reference to FIGS. 7a and 7b, a single card 70 is shown as an illustrative example of a preferred layout of each card associated with a musical pitch. FIG. 7b is the card of FIG. 7a rotated 180 degrees to more clearly show the illustrative layout. While only a single card is shown and described here, the remaining cards associated with a musical pitch would have a similar layout. The letter name 72 and modifier 74 (if one exists) of the musical pitch are positioned at opposite diagonal corners of the card. Where there is more than one letter name 72 and modifier 74 (if one exists) for the same musical pitch, one will be depicted in one corner with the other in the opposing corner. A card group identifier 76 can be depicted and positioned adjacent to the letter name 72 and modifier 74. The card group identifier 76 would be unique for each card group 12-15, and each card of a common card group would depict the same card group identifier. One or more scales 78 can be depicted laterally across one end. As shown, a group of four scales 78 are depicted. One or more chords 80 can be depicted laterally across then end opposite of the one or more scales 78. As shown, a group of chords 80 for four different scales are shown. A frequency value 82 can be depicted laterally across the center of the card.

Figure 8:
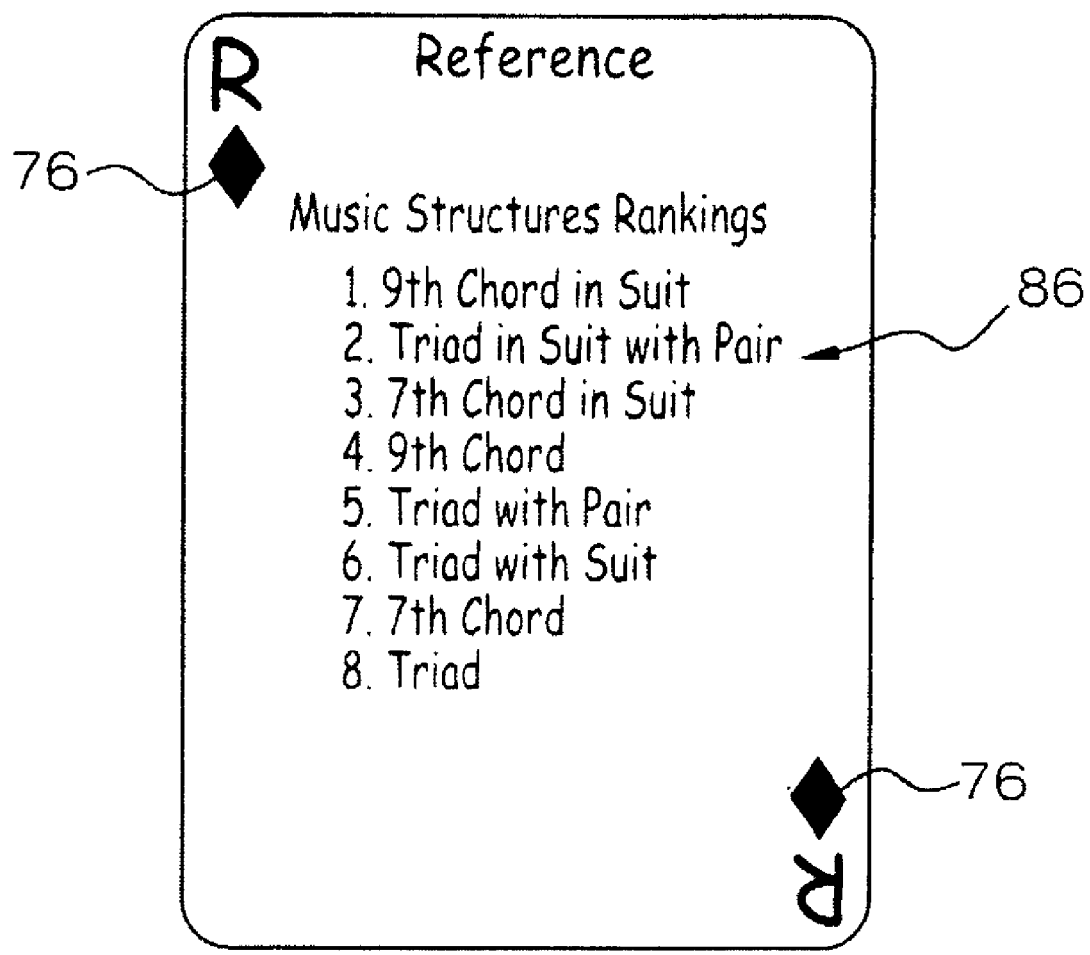
FIG. 8 is a diagrammatic view of a single reference card shown as an illustrative example of each reference card in the set of cards.

In FIG. 8, there is shown a single reference card 84 as an illustrative example of each reference card of card groups 12-15. While only a single reference card 84 is shown and described here, the remaining reference cards would have a similar layout. The reference card 84 can depict one or more different musical structures 86 that can be formed by hands of cards during game play. The musical structures 86 can be arranged and ordered according to the ranking of the hand of cards. The musical structures 86 can be arranged in a ranking from highest to lowest according to the mathematical probability of forming each music structure in a single hand of cards during game play using the set of playing cards. The musical structures 86 can be depicted and arranged to correspond to the mathematical probabilities of forming the hands in a game of poker.

With reference back to FIG. 6, there is shown a pair of wild cards 68 an 69. One or both cards 68 and 69 may depict a map 88 correlating each musical pitch of the chromatic scale to each card of a suite of cards in a set of traditional playing cards. The opposite card 68, 69 may depict various information or instructions.

It can now be appreciated that through the use of the familiar metaphor of playing traditional card games with the set of cards 10 in accordance with the present invention, learning musical fundamentals can be a pleasurable experience, especially for younger students and children. Variations of the set of cards 10 are possible. For example, the set of cards 10 can be provided with each card only depicting the letter names and modifiers (if one exists) for an associated pitch, and thus requiring a player to posses a knowledge of music scales, music chords, music structures and the like for playing a game with the set of cards. Likewise, the set of cards 10 can be provided with each card depicting any combination of music scales, music cords, music structures and musical pitch frequency.

A number of embodiments of the present invention have been described. Nevertheless, it will be understood that various modifications may be made without departing from the spirit and scope of the invention. Accordingly, other embodiments are within the scope of the following claims.

What is claimed is:

1. A set of playing cards for teaching music fundamentals, comprising:
a plurality of playing cards divided into a plurality of different card groups, each card group corresponding to a different octave group and including cards depicting the letter names and modifiers of musical pitches in the chromatic scale, each card is associated with only a single musical pitch of the chromatic scale and depicts the one or more letter names and modifiers corresponding to that musical pitch.

2. The set of playing cards according to claim 1, wherein each card depicts one or more music scales in the key of the musical pitch associated with the respective card.

3. The set of playing cards according to claim 2, wherein said one or more music scales includes at least the major scale, the minor scale, the dominate seven scale, and the half diminished scale.

4. The set of playing cards according to claim 1, wherein each card depicts one or more chords of a music scale in the key of the musical pitch associated with the respective card.

5. The set of playing cards according to claim 4, wherein each of said one or more chords includes at least the first, the third, the fifth, the seventh and the ninth interval of the respective chord.

6. The set of playing cards according to claim 1, wherein each card of a card group depicts a card group identifier that is unique to that card group.

7. The set of playing cards according to claim 1, wherein each card depicts the audio frequency value of the musical pitch associated with the respective card and according to the card group of which the respective card belongs.

8. The set of playing cards according to claim 1, wherein each card depicts the letter name and modifier of an equivalent musical pitch of the musical pitch associated with the respective card when an equivalent musical pitch exists.

9. The set of playing cards according to claim 1, wherein each card group further includes a reference card.

10. The set of playing cards according to claim 9, wherein said reference card depicts a plurality of music structures ordered in a ranking from highest to lowest according to the mathematical probability of forming each music structure during game play using the set of playing cards.

11. The set of playing cards according to claim 1, further comprising:
a pair of wild cards.

12. The set of playing cards according to claim 11, wherein at least one card of said pair of wild cards depicts a map correlating each musical pitch of the chromatic scale to a set of traditional playing cards.

* * * * *